Feb. 26, 1929.
W. A. SINKLIER
1,703,552
AUTOMATICALLY ADJUSTABLE HARNESS CONNECTION
Filed Nov. 7, 1927
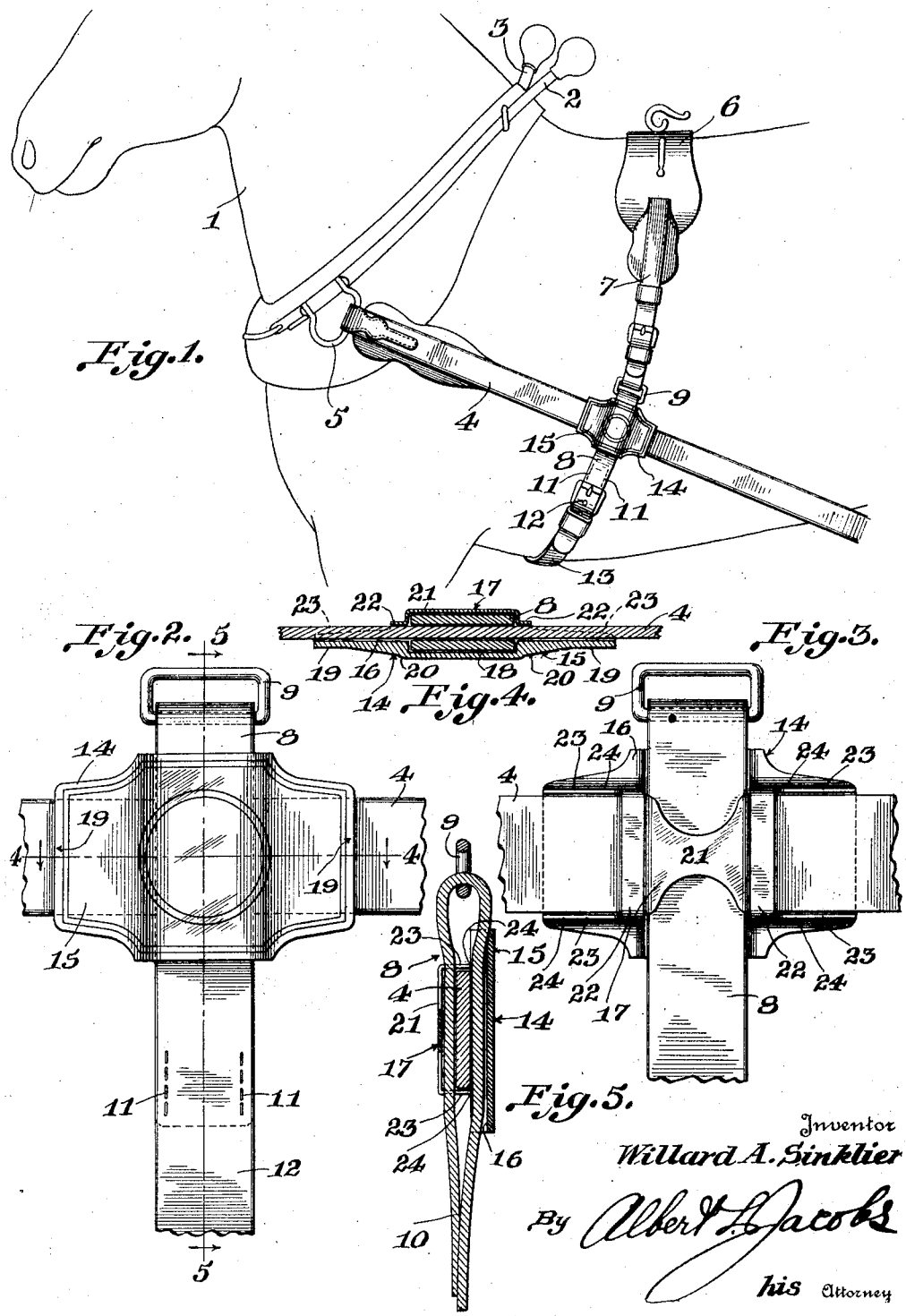
Inventor
Willard A. Sinklier
By Albert L. Jacobs
his Attorney Patented Feb. 26, 1929.

1,703,552

UNITED STATES PATENT OFFICE.

WILLARD A. SINKLIER, OF ADA, KANSAS.

AUTOMATICALLY-ADJUSTABLE HARNESS CONNECTION.

Application filed November 7, 1927. Serial No. 231,704.

This invention relates to harness for horses and more particularly to a connection for the trace and side loop straps of harness which permits automatic adjustment thereof to adapt itself to the size of the horse and the conditions of usage.

In harness hitherto used, it was required to make various adjustments of the harness to suit, as near as possible, the various sizes of horses or mules. Such adjustments took much time and a new adjustment had to be made to suit each condition of its use. Such adjustments were not accurate either so that the movements of the horse were needlessly hindered and sores appeared at points where chafing or rubbing occurred. Furthermore, these adjustments were of no use in uneven country, rough fields, in crossing ditches, and in going up and down hills and the like.

Among the objects of my invention, therefore, are: the provision of a harness connection that may easily be attached to existing harness in a few minutes without the aid of tools; the provision of an automatically adjustable connector which will conform the harness to all sizes of horses and all conditions of usage without attention and without binding or chafing the horse; and the provision of a connector to take the place of existing connections which will be simple, efficient, and admirably adapted for the purposes and operation for which it was designed. For the attainment of the foregoing objects and such other objects as may hereinafter appear or be pointed out, I have illustrated the preferred embodiment in the accompanying drawing wherein:

Figure 1 illustrates the manner of use of my invention;

Figure 2 is a face view of the device showing the harness straps passing therethrough;

Figure 3 is a rear view of the device with the straps in place;

Figure 4 is a section on the line 4—4 of Figure 2; and

Figure 5 is a section on the line 5—5 of Figure 2.

Similar numerals refer to similar parts throughout the several views.

Referring to the drawings in detail, there is shown in part the outlines of a horse 1 with the hames 2 and 3 around the neck. The trace 4 is connected to the hame 2 in any suitable manner such as by means of connecting element 5. The back pad 6 is shown in position on the back of the horse with back band strap 7 in the usual relation thereto. The side loop strap 8 is connected through the medium of an iron connecting element 9 to the back strap 7. The side loop strap 8, as shown in Figure 5, is provided with a loop through which the iron connecting element 9 passes. Side loop strap 8 is therefore double above a point 10 and single below that point. In other words, the end of the strap is doubled over and fastened at 11. The portion 12 of strap 8 below the fastenings 11 is termed the belly band billet end due to that fact that it is connected with belly band strap 13, it being usual to buckle the two together in adjustable relation as shown.

My invention consists among other things in the provision of the connector 14 which will now be described in detail.

The connector 14 consists of a solid cast metal member preferably having the configurations to be explained for the purposes mentioned. The front face thereof 15 may be ornamented as desired to add to the appearance of the connector. This may be done by making suitable provision at the time of casting such as by providing the form with proper means to accomplish such or the ornamentation may be applied afterward. An appropriate form (not shown) receives molten metal to form the solid one-piece cast connector which is therefore very strong. It is preferred to make the connector of a solid casting, although it could also be made by stamping out the several parts and then uniting them as by rivets, solder, or the like. The shape of the connector is adaptable to the specific need but generally speaking is somewhat rectangular in shape with cut out curves adjacent the four corners.

The rear face 16 of the cast connector is provided with a portion 18 which forms a channel or guide for a strap passing therethrough. Looking at Fig. 4, one side of the loop of strap 8 is shown resting in the channel. Rising from the rear face of the casting, will be seen the portion 17 termed a bridge or bridging portion for obvious reasons. This bridge portion is clearly seen as being itself provided with a portion 21 which forms a channel or guide for a strap in a manner similar to portion 18. Portion 21 is opposed to portion 18 and faces the latter for the reception of the other side of the loop of strap 8, shown therein. The lower portions 22 of bridge 21 are shown as tapering off into side portions 23 of general triangular shape. As will be clear from Figs. 3 and 4, portions 22 form limiting members which prevent rising of the strap 4 thereabove, while portions 23 provide an interrupted guide for the strap keeping it within the confines thereof. Portions 22 are shown as being relatively narrow but such may be of any desired width and may substantially enclose the strap 4, if preferred. The channels or guides are preferably so proportioned that straps of various widths may be accommodated therein, thus increasing the usefulness of the connector. Numerals 19, 19 indicate on Fig. 4 the ends of the casting where it may be the thinnest, in the embodiment illustrated. Numerals 20, 20 indicate the connecting surfaces or curves between the highest and the lowest portions of the casting, although it is clear that the ends 19, 19 may be thicker, if desired, so as to form a flat uncurved face for the cast connector. Numerals 24 indicate the curving or surfaces of the casting from the portions 23 to the rear face portion and such may be substantially right-angled or any desired curvature to lend strength and good appearance to the casting. Any suitable or desired material or metal may be used within the scope of the invention which will lend itself to and permit of the formation into the connector as herein described.

Permissible variations within the scope of the invention contemplate the use of a buckle in place of the metal member 9, which is shown as substantially rectangular and is described as often of D-shape.

Another contemplated variation consists of the elimination of the market strap or strap 7. If desired, strap 8 may pass right on up to the back pad and in such case no member 9 at all is required. Such variations depend on the particular harness maker and the particular conditions that he is trying to meet. Whatever the type of harness or the conditions which it is designed to fulfill, my one-piece solid cast connector is adaptable thereto and operates in the way hereinabove described as well as within the terminology of what is to follow. In other words, my connector is independent of the nature of the harness and the specific conditions of usage as long as there is provided two straps crossing in any analogous location where infinitely variable adjustment is required or desired.

The method of assembling the connector 14 and the straps will be clear. The belly band billet end 12 of side loop strap 8 is passed down between the opposed channels until it assumes a position about as shown in the drawings; that is, the strap is pulled down until the loop of the strap is well within the connector and the sides of the loop seat in the channels provided. The trace 4 is then passed under members 22 at right angles to strap 8, being guided by and retained between the substantially triangular members 23, and passing between the sides of the loop of strap 8. In other words, the loop of strap 8 straddles the trace 4. The member 9 may be any suitable shape such as that shown, or D-shaped, and may be already inserted through the loop or later inserted, as most convenient, so that strap 8 is connected to strap 7, which is the back strap. The belly band billet end 12 is then buckled to the belly band strap 13. A very strong connection is thereby obtained which improves the appearance of the whole harness.

It will be seen upon consideration that an automatically adjustable connection has been obtained. The harness will automatically adjust itself to the size of the horse in the first place. For a small horse, the belly band is buckled up tighter, of course. This causes the connector 14 to move up on the strap 8 and raise the trace, thus fitting the horse and permitting proper freedom of movement. On a large horse, the belly band is not buckled up so much and the trace is therefore carried down by the downward movement of the connector, thus fitting the horse. At the same time, the connector slips forward or backward, as required, on the trace so that the harness completely fits the horse. With the use of my connector, the belly band will not be held up against the front legs of the horse thus causing sores, as is the case with the old style connection, nor will the belly band go too far back on a small horse or mule as the automatic connector moves forward and fits the harness to the particular animal. Furthermore, the automatically adjusting connector allows the harness to move with and adjust itself to the motion of the horse. In rough fields, in crossing ditches, in going up and down hills, and the like, the horse has proper freedom at all times. There is no down pull on the back band or up pull on the belly band. With high or low hitch, the draft is maintained straight from the shoulder by means of the automatic connector, the traces moving up or down to suit the hitch. There is no down pull on the back of the horse to cause sores. All the operator has to do is to attach the connector and buckle the belly band up a little more for a small horse than for a large horse. The connector then automatically adjusts the harness in all particulars to suit the size of the horse and the conditions of usage.

All the above matters are intended to be more illustrative than limitative so that I do not limit myself thereto except as contained in the subjoined claims.

Having thus described my invention and illustrated its use, what I claim as new and desire to secure by Letters Patent of the United States is:

1. A connector for the trace and side loop straps of harness adapted to adjust the harness automatically to the size of the horse and the conditions of usage, said connector consisting of a front face portion, a rear face portion which is provided with a strap receiving channel, and a bridge portion rising from said rear face portion and provided with a strap receiving channel opposed to said first-named channel, whereby straps therein will have free slipping action.

2. A connector for the traces and side loop straps of harness adapted to adjust the harness automatically to the size of the horse and the conditions of usage, said connector consisting of a front face portion, a rear face portion which is provided with a strap receiving channel, and a bridge portion rising from said rear face portion and provided with a strap receiving channel opposed to said first-named channel, said bridge portion being further provided with strap guiding means substantially at right angles to said strap receiving channels, whereby free slipping action of said straps relatively to each other is permitted.

In testimony whereof I hereunto set my hand this 1st day of November, 1927.

WILLARD A. SINKLIER.